June 23, 1953 — C. E. CARLSON ET AL — 2,643,323
COMBINATION SPACE AND WATER HEATING UNIT Filed May 1, 1952 — 2 Sheets-Sheet 1

INVENTORS.
GORDON HATCH
CLIFFORD E. CARLSON
BY Rudolph L. Lowell
ATTORNEY.

June 23, 1953  C. E. CARLSON ET AL  2,643,323
COMBINATION SPACE AND WATER HEATING UNIT
Filed May 1, 1952  2 Sheets-Sheet 2
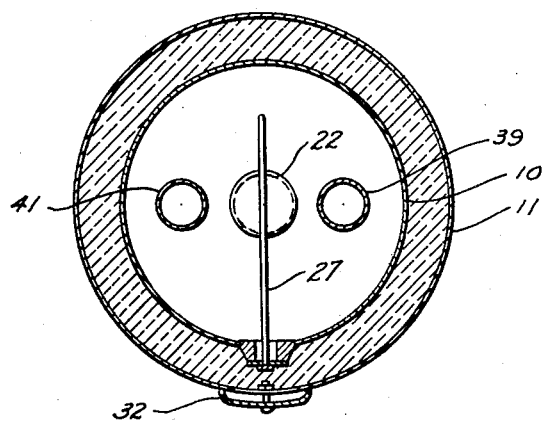
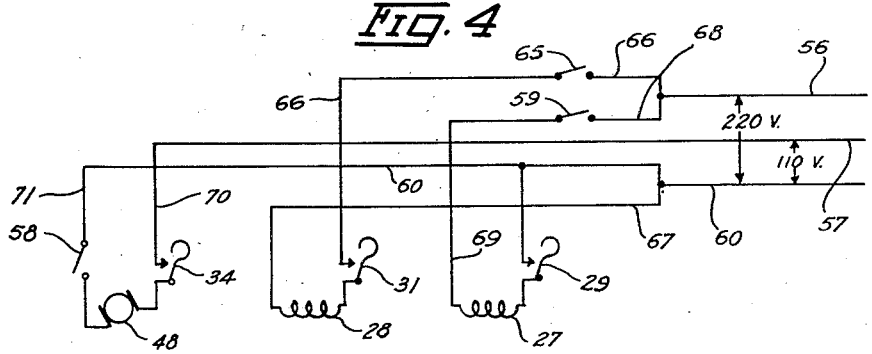
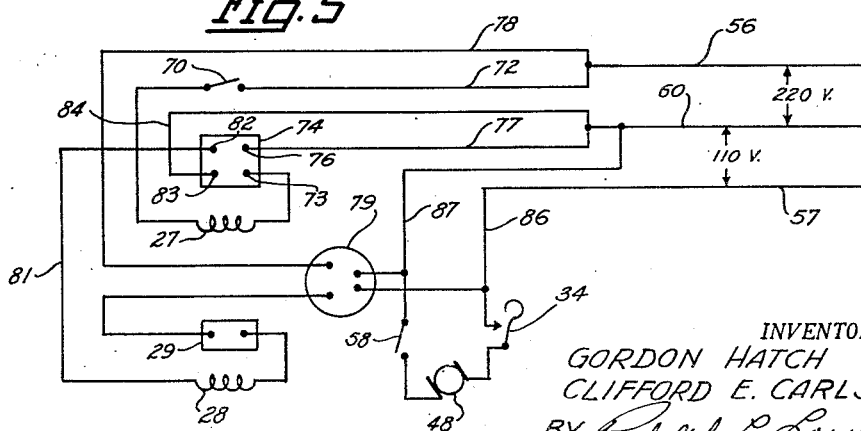
INVENTOR.
GORDON HATCH
CLIFFORD E. CARLSON
BY Rudolph L. Lowell
ATTORNEY.

Patented June 23, 1953

2,643,323

UNITED STATES PATENT OFFICE 2,643,323

COMBINATION SPACE AND WATER HEATING UNIT

Clifford E. Carlson, Oshkosh, and Gordon Hatch, Milwaukee, Wis.

Application May 1, 1952, Serial No. 285,356

6 Claims. (Cl. 219—39)

This invention relates generally to heating apparatus and in particular to a combination space and water heating unit adapted for use in farm dairy rooms and the like.

It is well known that electricity may be purchased cheaper during what are termed off-peak load periods, such as during the late night and early morning hours. Appreciable savings can thus be effected in the utilization of such cheaper electricity for heating and the storing of heat to be used in other hours of the day.

It is an object of this invention, therefore, to provide an improved combination room and water heater.

A further object of this invention is to provide a combination room and water heater which is economical in initial cost and in the cost of maintenance and service, and efficient in operation to concurrently or separately heat water or the room in which the heater is located.

Still a further object of this invention is to provide a combination space and water heater in which the water reservoir functions as a heat exchanger for heating air circulated therethrough when room heating is required.

Further objects, features and advantages of this invention will become apparent from the following description when taken in connection with the accompanying drawings in which:

Fig. 3 is a transverse sectional view as seen on the line 3—3 in Fig. 1;

Fig. 4 is a diagrammatic showing of the electrical circuit for the heater apparatus of this invention; and Fig. 5 is a modified form of the circuit shown in Fig. 4.

Figure 1:
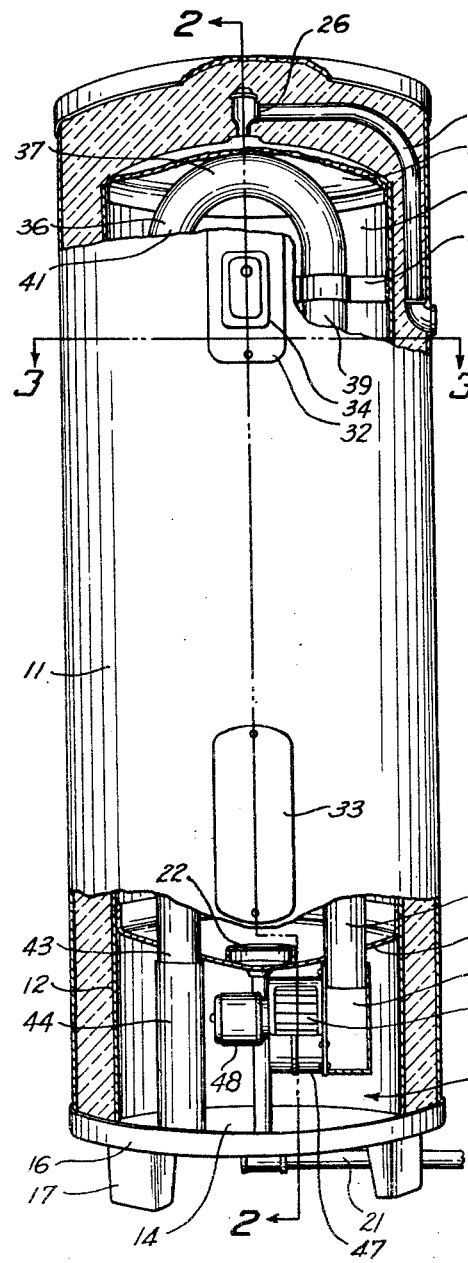
Fig. 1 is a perspective view of the heater apparatus of this invention with certain parts broken away and other parts shown in section to more clearly illustrate its construction.
Figure 2:
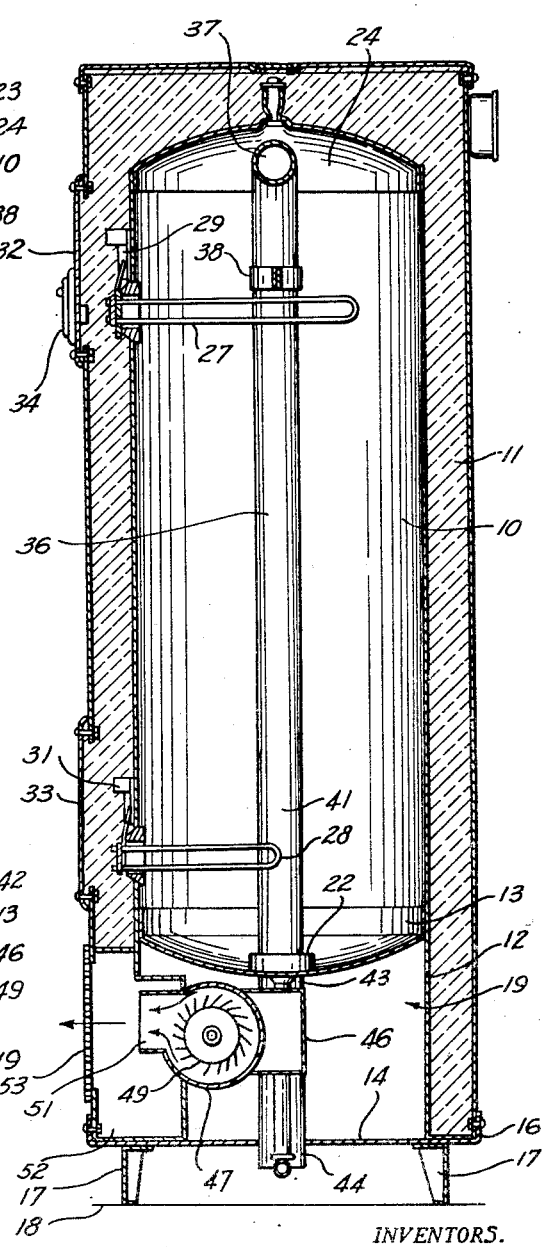
Fig. 2 is a longitudinal sectional view taken along the line 2—2 in Fig. 1.

With reference to the drawings the heater apparatus of this apparatus is illustrated in Figs. 1 and 2 as including an upright water tank or reservoir 10 of a type commonly used in commercial domestic water heaters. The reservoir is enclosed within a thermal insulating wall or hood 11 the lower end 12 of which extends downwardly from the lower end 13 of the tank 10, so as to form an insulation skirt at the lower end of the tank. The skirt 12 is supported on a flat disc or base member 14, which has an upturned peripheral flange 16 within which the bottom end of the skirt 12 is received. Legs 17 carry the base 14 at a position spaced above the floor surface 18.

It is seen, therefore, that the tank 10 is spaced above the floor surface 18 and that a motor compartment or space 19 is formed by the skirt 12, the base 14 and the lower end 13 of the tank 10.

Cold water to be heated is admitted into the lower end 13 of the tank 10 from a supply line 21, with a spreader member 22 being arranged within the tank 10 at the connection thereof with the supply line 21, for the purpose of distributing the water upwardly through the tank. A hot water outlet pipe 23 is connected with the upper end 24 of the tank 10 as indicated at 26 in Fig. 1.

Water within the tank 10 is heated by a pair of heating elements 27 and 28 (Figs. 2 and 3), which are located within the tank and immersed in the liquid or water therein. The elements 27 and 28 are spaced vertically of the tank, so as to be adjacent opposite ends thereof, and are equipped with thermostatic control units 29 and 31, respectively. Access to the heating elements 27 and 28 is had by the provision of cover plates 32 and 33, respectively, carried on the insulating wall 11. The cover plate 32 also carries a room thermostat 34, on the outside surface thereof, for a purpose to appear later.

Located within the tank 10 in a heat exchange relation with the water therein is an upright air duct or tube 36 of an inverted U-shape (Figs. 1 and 2), and of a length substantially coextensive with the length of the tank 10 so that the upper end or curved portion 37 of the air duct is adjacent to the upper end 24 of the tank. This upper end 37 is supported by a brace member 38 positioned transversely of the tank 10, with the opposite ends thereof secured to the side wall of the tank by welding or the like.

The leg members 39 and 41 of the air duct 36 are arranged in a substantially parallel spaced relation at opposite sides of the heating elements 27 and 28 (Figs. 2 and 3). The terminal ends 42 and 43, of the leg members 39 and 41, respectively, project downwardly from the lower end of the tank 10, with the terminal end 43, which constitutes an air inlet for the air duct 36, being provided with an extension 44 that projects downwardly through the base member 14 for termination at a position adjacent to the floor surface 18.

The terminal end 42 of the leg member 39 carries, within the space 19, a casing 46 (Figs. 1 and 2) which forms the inlet for the housing 47 of an air blower 49. An electric motor 48 for the air blower 49 is secured to the outside of the housing 47. A housing air discharge portion 51 extends laterally of the leg member 39 and is connected with an air outlet casing 52 positioned within the skirt 12 of the hood 11 and provided with a grill 53.

As shown in Figs. 1 and 2, the casings 46 and 52, blower housing 47, and blower motor 48 are all located within the compartment or space 19, and the air outlet casing 52 is extended through the skirt portion 12 of the insulating hood 11, so that air discharged by the blower is directed laterally outwardly from the heater. It is seen, therefore, that the air to be heated is drawn into the air duct 36 upwardly through the inlet leg member 39 from a position adjacent the floor surface 18, about the curved duct portion 37 and then downwardly, over the full height of the tank 10 in a heat exchange relation with the heated water therein, for discharge laterally from the heater through the grill 53.

The electrical circuit for the heater of this invention, as illustrated in Fig. 4, contemplates the operation of the heating elements 27 and 28 on 220 volts and the operation of the motor 48 on 110 volts, with the 220 volt lead line 56 and the 110 volt lead line 57 having a common ground line 60.

The heating elements 27 and 28 are connected in parallel across the lines 56 and 60, with element 27 being in series connection with the thermostat 29 and a control switch 59 and the element 28 in series connection with the thermostat 31 and a control switch 65. Thus the circuit for the heating element 28, from the lead line 56 includes conductor 66, which connects in series the control switch 65 and thermostat 31, and a conductor 67 which is connected to the ground line 60. In a like manner the circuit for the heating element 27, from the lead line 56, includes a conductor 68 having in series connection the control switch 59, and a conductor 69, which carries the thermostat 29 in series connection, connected to the ground line 60.

The blower motor circuit from the lead line 57 includes conductor 70, which carries the room thermostat 34, and a conductor 71 which is connected to the ground line 60, with the control switch 58 for the motor 48 being series connected in the conductor 71. It is seen, therefore, the heating elements 27 and 28 and blower motor 48 can be operated separately or concurrently.

In the operation of the heater of this invention let it be assumed that only hot water is wanted. For this purpose, the switch 58 is opened, and the switches 59 and 65 are closed, so that the heater operates in all respects as a usual domestic water heater of electrical type. By virtue of the curved portion 37 at the upper end of the air duct 36, a high efficiency of the heater for water heating purposes alone is maintained, since the air heated within the air duct 36 is trapped within the curved portion 37, so as to substantially eliminate any flow of air through the duct that would act to remove heat stored within the water.

When room heating is desired, the switch 58 is closed to provide for the operation of the motor 48 and the movement and the circulation of air through the duct 36 upwardly through its leg member 41, for discharge through the leg member 39 and into the room from the outlet casing 52, with the air being heated as it passes through the duct 36, by virtue of the heat exchange relation of the duct with the heated water within the tank 10.

It will be readily apparent that in the use of the heater in a farm dairy room or the like, and especially for operation in the winter months, on closing the switches 58 and 59 during hours of off-peak loads, the water in the tank 10, and the dairy room in which the heater is located, will both become heated. As a result, for the early morning milking chore the dairy room will be comfortably warm and hot water will be available for the washing of milking equipment and the like, without requiring any substantial amount of electricity during on-peak load periods. In this connection it will be noted that the thermostats 29, 31 and 34 will automatically shut off the heating elements and blower motor when the water and the room have been heated to their predetermined temperatures as set by the thermostats.

To fully utilize the advantages of off-peak load periods, without requiring manual attention to the control switches 59 and 65 for the heating elements 27 and 28, respectively, the modified electrical circuit shown in Fig. 5 may be used. In this modification the circuit for the heating element 27 from the lead line 56 includes conductor 72, which carries a control switch 70 and the elements 27 and is connected to terminal 73 of a double throw thermostat 74. The circuit for the element 27 is closed through terminal 76 which is connected to the ground line 60 through conductor 77.

The circuit for the heating element 28, from the lead line 56, includes a conductor 78 connected through a time clock 79 and the thermostat 29 with one side of the element 28, the other side of which is connected through conductor 81 with terminal 82 of the double throw thermostat 74. The circuit for the element 28 is closed through the thermostat 74 across terminals 82 and 83, with terminal 83 being connected to the ground line 60 by conductor 84.

The circuit for the motor 48 from lead line 57 includes conductor 86, which carries the room thermostat 34, and conductor 87 which is connected to the ground line 60. The time or metering clock 79 is connected across the conductors 86 and 87 for continuous operation.

In operation of the heater with the circuit of Fig. 5, on closing of the switch 70 only the heating element 27 is energized. When the thermostat 74 has been satisfied, element 27 is de-energized and the element 28 is energized, so that only the element 27 or the element 28 is in operation. It is to be understood, of course, that the operation of element 28 is dependent upon the circuit therefor being closed through the thermostat 74 and the metering clock 79, which is set to close the circuit only during off-peak load periods.

The operation of the blower motor 48 in the circuit of Fig. 5 is the same in all respects as its operation in the circuit of Fig. 4.

From a consideration of the above description it is seen that the invention provides a combination space and water heater which is of a simple and compact design, and efficient in operation to separately or concurrently heat water or a room. Where separate heating of the room is required, it will be appreciated that the water within the tank 10 will function as a heat exchanger relative to the air flowing through the duct 36, and that the heating elements 27 and 28 will be operated only when the temperature of the water within the tank 10 has dropped below a temperature that will satisfy the requirements of the room thermostat 34.

Although the invention has been described and illustrated with respect to a preferred embodiment thereof it is to be understood that it is not to be so limited since changes can be made therein which are within the full intended scope of this invention as defined by the appended claims.

We claim:

1. A heating apparatus comprising a thermal insulated reservoir containing a heat exchange liquid, electric means immersed in said liquid for heating the same, an upright air duct of an inverted U-shape positioned within said reservoir having leg portions the terminal ends of which project downwardly from the lower side of said reservoir, with one of said terminal ends constituting an air inlet and the other of said terminal ends an air outlet, an electric blower means for moving air through said air duct, and an electrical circuit for said blower means and heating means including switch controls providing for the separate or simultaneous operation of said blower means and said heating means.

2. A combination room and water heater including a reservoir for containing water, means supporting said reservoir at a position above a floor surface, an upright air duct of an inverted U-shape arranged in a heat exchange relation with the water in said reservoir, said air duct having leg members positioned within the reservoir such that the free ends thereof project downwardly from the lower side of said reservoir, with one of said leg ends being located adjacent the floor surface and constituting an inlet for said air duct, an electric blower means for moving air in the room through said inlet for discharge into the room from the other of said leg ends, a thermal insulating wall for said reservoir, and electrical heating elements immersed in said water for heating the same.

3. A combination room and water heater including an upright reservoir containing water, electrical means immersed in said water for heating the same, means supporting said reservoir above a floor surface, a thermal insulating hood for said reservoir extended below the lower end of said reservoir to a position adjacent the floor surface, an upright air duct of an inverted U-shape located within said reservoir in a heat exchange relation with the water therein, and having the legs thereof extended downwardly from the lower end of said reservoir, with the terminal end of one of said legs constituting an air inlet, and the other of said legs terminating in an outlet which is extended through said hood below said reservoir, and an electric blower means arranged within said hood at a position below said reservoir for drawing air through said air duct from said inlet for discharge into the room from said outlet.

4. A combination space and water heater including an upright reservoir for containing water, a thermal insulating wall for said reservoir, means supporting said reservoir at a position above a floor surface, electrical heating elements immersed in said water for heating the same, an upright air duct of an inverted U-shape positioned in said reservoir in a heat exchange relation with the water therein, with the upper end of said air duct being adjacent the upper end of said reservoir, and the free ends of the leg members of said air duct being projected downwardly from the lower end of said reservoir, with one of said ends terminating adjacent the floor surface and constituting an air inlet for said duct, and the other of said legs terminating in a lateral projection constituting an air outlet for said duct, and an electric air blower arranged in said outlet for drawing air at said inlet through said air duct for discharge from said outlet.

5. A combination space and water heating unit including an upright reservoir for containing water, a thermal insulating wall for said reservoir, electric elements for heating said water immersed in said water at positions spaced vertically of said reservoir, an upright air duct located within said reservoir in a heat exchange relation with said water, with the upper end of said air duct being of an inverted U-shape and positioned adjacent the top end of said reservoir, said duct having the legs thereof projected outwardly from said reservoir and with one of said legs terminating at a lower level than the other of said legs, and an electric blower means for moving air through said one leg of the air duct for discharge from the other leg thereof.

6. A combination space and water heating unit comprising an upright water reservoir, electric heating means in said reservoir for heating the water therein, an upright air duct of an inverted U-shape arranged within said reservoir so that the base portion of said duct is adjacent the upper end of the reservoir and the leg portions of said duct terminate adjacent and to the outside of the lower end of said reservoir, and blower means arranged for moving air through said duct for heating of the air by the water in said reservoir.

CLIFFORD E. CARLSON.
GORDON HATCH.

References Cited in the file of this patent

UNITED STATES PATENTS

| Number | Name | Date |
| --- | --- | --- |
| 2,438,834 | Wartes | Mar. 30, 1948 |
| 2,455,988 | Fife | Dec. 14, 1948 |